(12) United States Patent
Pendakur et al.

(10) Patent No.: US 10,028,010 B2
(45) Date of Patent: Jul. 17, 2018

(54) METHOD AND APPARATUS FOR BUILDING A HARDWARE ROOT OF TRUST AND PROVIDING PROTECTED CONTENT PROCESSING WITHIN AN OPEN COMPUTING PLATFORM

(71) Applicant: Intel Corporation, Santa Clara, CA (US)

(72) Inventors: Ramesh Pendakur, Gaston, OR (US); Walter C. Gintz, Lake Oswego, OR (US); Daniel Nemiroff, Folsom, CA (US); Mousumi M. Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 14/139,422

(22) Filed: Dec. 23, 2013

(65) Prior Publication Data

US 2014/0112471 A1    Apr. 24, 2014

Related U.S. Application Data

(62) Division of application No. 12/984,737, filed on Jan. 5, 2011, now Pat. No. 8,625,788.

(51) Int. Cl.
*H04N 21/4367*    (2011.01)
*G06F 21/72*    (2013.01)
(Continued)

(52) U.S. Cl.
CPC ....... *H04N 21/4367* (2013.01); *G06F 21/123* (2013.01); *G06F 21/72* (2013.01);
(Continued)

(58) Field of Classification Search
CPC ......... H04N 21/4367; H04N 21/43635; H04N 21/4405; H04N 21/63345; H04N 21/4181; H04L 9/3234; G06F 21/123; G06F 21/72
See application file for complete search history.

(56) References Cited

U.S. PATENT DOCUMENTS 6,728,379 B1    4/2004   Ishibashi et al.
7,103,574 B1 *   9/2006   Peinado ................ G06F 21/10
                                             705/51
(Continued)

FOREIGN PATENT DOCUMENTS

CN        101040265       9/2007
CN        101359986 A    2/2009
(Continued)

OTHER PUBLICATIONS

Intel, "Intel E7230 Chipset Memory Controller Hub (MCH)", Jul. 2005, accessed online on Jun. 20, 2016 @ [http://www.intel.com/content/dam/doc/datasheet/e7230-chipset-memory-controller-hub-datasheet.pdf].*
(Continued)

*Primary Examiner* — Robert B Leung
(74) *Attorney, Agent, or Firm* — Barnes & Thornburg LLP (57) ABSTRACT

A system architecture provides a hardware-based root of trust solution for supporting distribution and playback of premium digital content. In an embodiment, hardware root of trust for digital content and services is a solution where the basis of trust for security purposes is rooted in hardware and firmware mechanisms in a client computing system, rather than in software. From this root of trust, the client computing system constructs an entire media processing pipeline that is protected for content authorization and playback. In embodiments of the present invention, the
(Continued)

security of the client computing system for content processing is not dependent on the operating system (OS), basic input/output system (BIOS), media player application, or other host software.

18 Claims, 5 Drawing Sheets

(51) Int. Cl.

| | |
|---|---|
| *G06F 21/12* | (2013.01) |
| *H04L 9/32* | (2006.01) |
| *H04N 21/4363* | (2011.01) |
| *H04N 21/4408* | (2011.01) |
| *H04N 21/6334* | (2011.01) |
| *H04N 21/418* | (2011.01) |

(52) U.S. Cl.
CPC ..... *H04L 9/3234* (2013.01); *H04N 21/43635* (2013.01); *H04N 21/4408* (2013.01); *H04N 21/63345* (2013.01); *H04N 21/4181* (2013.01)

(56) References Cited

U.S. PATENT DOCUMENTS

| | | |
|---|---|---|
| 7,159,112 B1 | 1/2007 | Williams |
| 7,293,178 B2 | 11/2007 | Evans et al. |
| 7,702,925 B2 | 4/2010 | Northcutt et al. |
| 8,625,788 B2 | 1/2014 | Pendakur et al. |
| 2002/0062445 A1 | 5/2002 | Owada et al. |
| 2002/0099955 A1* | 7/2002 | Peled ............... G06F 21/10 726/27 |
| 2003/0005295 A1 | 1/2003 | Girard |
| 2003/0030720 A1* | 2/2003 | Hutchings .......... H04N 7/142 348/14.02 |
| 2003/0159139 A1* | 8/2003 | Candelore .......... H04N 7/162 725/25 |
| 2004/0109563 A1 | 6/2004 | Evans et al. |
| 2004/0172533 A1* | 9/2004 | DeMello ............ G06F 21/10 713/164 |
| 2005/0182948 A1* | 8/2005 | Ducharme ........... G06F 21/10 713/189 |
| 2006/0156377 A1* | 7/2006 | Gentric ............... H04N 7/1675 725/138 |
| 2006/0165232 A1* | 7/2006 | Burazerovic ........ H04K 1/00 380/37 |
| 2006/0184802 A1* | 8/2006 | Ibrahim ............. G06F 21/606 713/189 |
| 2006/0242069 A1 | 10/2006 | Peterka et al. |
| 2007/0100771 A1* | 5/2007 | Eckleder ............ G06F 21/10 705/67 |
| 2007/0266256 A1* | 11/2007 | Shah ................. G06F 21/725 713/178 |
| 2008/0046756 A1 | 2/2008 | Dempski et al. |
| 2009/0060182 A1 | 3/2009 | Killian et al. |
| 2009/0172820 A1 | 7/2009 | Watson |
| 2009/0245521 A1 | 10/2009 | Vembu et al. |
| 2010/0002875 A1* | 1/2010 | Li .................... H04N 7/1675 380/42 |
| 2012/0173877 A1 | 7/2012 | Pendakur et al. |

FOREIGN PATENT DOCUMENTS

| | | |
|---|---|---|
| CN | 101751529 | 6/2010 |
| EP | 1801725 A2 | 6/2007 |
| JP | 20070056133 | 5/2007 |
| JP | 2007-215159 A | 8/2007 |
| JP | 2008-517401 A | 5/2008 |
| TW | 200638725 | 11/2006 |
| WO | 2006044749 A2 | 4/2006 |
| WO | 2012094196 A2 | 7/2012 |

OTHER PUBLICATIONS

Notice of Preliminary Rejection for Korean Patent Application No. 10-2013-7020692, dated Jan. 27, 2015, 15 pages.
Notice of Last Preliminary Rejection for Korean Patent Application No. 10-2013-7020692, dated Feb. 5, 2016, 3 pages.
International Preliminary Report on Patentability received for PCT Patent Application No. PCT/US2011/067472, dated Jul. 18, 2013, 6 pages.
International Search Report and Written Opinion received for PCT Patent Application No. PCT/US2011/067472, dated Aug. 22, 2012, 9 pages.
Brickell et al., "Enhanced Privacy ID (EPID)," NIST Meeting on Privacy-Enhancing Cryptography, Dec. 2011, 22 pages.
Paral et al., "Reliable and Efficient PUF-Based Key Generation Using Pattern Matching," IEEE International Symposium on Hardware-Oriented Security and Trust, Jun. 2011, 6 pages.
Brickell et al., "Enhanced Privacy ID, A remote anonymous attestation scheme for hardware devices," available at http://www.drdobbs.com/security/enhanced-privacy-id/219501634, Sep. 8, 2009, 7 pages.
Digital Content Protection LLC, "High-bandwidth Digital Content Protection System: Interface Independent Adaptation," Revision 2.0, Oct. 23, 2008, 58 pages.
Brickell et al., "Enhanced Privacy ID using Bilinear Pairing," NIST Identity Based Encryption Workshop, Jun. 2008, 8 pages.
Brickell et al., "Enhanced Privacy ID: A Direct Anonymous Attestation Scheme with Enhanced Revocation Capabilities," Aug. 17, 2007, 36 pages.
Digital Content Protection LLC, "High-bandwidth Digital Content Protection System," Revision 1.3, Dec. 21, 2006, 90 pages.
Krawczyk, "SIGMA: the 'SIGn-and-MAc' Approach to Authenticated Diffie-Hellman and its Use in the IKE Protocols," Jun. 12, 2003, 32 pages.
English translation of Final Notice of Reasons for Rejection dated Feb. 24, 2015 in connection with Japanese Patent Application No. 2013-548432, 3 pages.
English translation of Non-Final Office Action dated Sep. 22, 2014 in connection with Taiwanese Patent Application No. 100148639, 9 pages.
Non-Final Office Action dated Sep. 22, 2014 in connection with Taiwanese Patent Application No. 100148639, 12 pages.
First Chinese Office Action, Chinese Application No. 201180066953.2, dated Dec. 1, 2015, 9 pages.
Kaplan, Marc A., "IBM Cryptolopes Super Distribution and Digital Rights Management," IBM Corporation, Dec. 30, 1996, 7 pages.
European Search Report for Application No. 11855191.0-1870/2661716, dated Apr. 11, 2016, 7 pages.
Brickell, et al., "Enhanced Privacy ID: A Direct Anonymous Attestation Scheme with Enhanced Revocation Capabilities", 6th Workshop on Privacy in the Electronic Society (WPES), Aug. 17, 2007, 39 pages.
Organized English Translation of "Notice of Reasons for Rejection", Japanese Patent Application No. 2013-548432, Aug. 26, 2014, 6 pages.
Office Action, Search Report, and English Translation for Taiwanese Patent Application No. 104113283, dated Apr. 25, 2016, 8 pages.
Brickell, Ernie, et al., "Enhanced Privacy ID: A Direct Anonymous Attestation Scheme with Enhanced Revocation Capabilities," dated Aug. 17, 2007, 36 pages.
Office Action for Korean Patent Application No. 10-2016-7025473, dated Apr. 25, 2017, 4 pages.
Office Action for Korean Patent Application No. 10-2016-7025473, dated Jun. 28, 2017, 3 pages.
Office Action, Search Report, and English Translation for Taiwan patent application No. 105129143, dated Dec. 6, 2017, 7 pages.

\* cited by examiner

METHOD AND APPARATUS FOR BUILDING A HARDWARE ROOT OF TRUST AND PROVIDING PROTECTED CONTENT PROCESSING WITHIN AN OPEN COMPUTING PLATFORM

CROSS-REFERENCE TO RELATED APPLICATION

This application is a divisional application of U.S. application Ser. No. 12/984,737, entitled "Method and Apparatus for Building a Hardware Root of Trust and Providing Protected Content Processing Within an Open Computing Platform," which was filed on Jan. 5, 2011.

FIELD

The present disclosure generally relates to the field of computing system architectures for securely processing digital content. More particularly, an embodiment of the invention relates to building a hardware root of trust and protecting digital content processing end-to-end in a computing system.

BACKGROUND

On open computing platforms, such as a personal computer (PC) system for example, when playing premium content (such as from a DVD, Blu-Ray, etc.), the digital rights management (DRM) processing and key management are typically performed in software by a media player application program. These schemes are not well protected and there have been instances of hacking, resulting in pirated content and loss of revenue to content owners. When content is played, even though the media decompression (such as H.264, MPEG-2, etc.) is done in hardware, the content is in the clear in system memory and can be stolen with software-based and/or hardware-based attacks. Due to these noted security weaknesses, only lower fidelity (such as standard definition (SD)) content or less valuable high definition (HD) content is typically distributed to open computing platforms. Improvements to the secure handling of digital content by open computing platforms (such as a PC, for example) are desired.

BRIEF DESCRIPTION OF THE DRAWINGS

The detailed description is provided with reference to the accompanying figures. The use of the same reference numbers in different figures indicates similar or identical items.

DETAILED DESCRIPTION OF THE DRAWINGS

Embodiments of the present invention comprise a system architecture that provides a hardware-based root of trust (HW ROT) solution for supporting distribution and playback of premium digital content. In an embodiment, HW ROT for digital content and services is a solution where the basis of trust for security purposes is rooted in hardware and firmware mechanisms in a client computing system, rather than in software. From this root of trust, the client computing system constructs an entire media processing pipeline that is protected for content authorization and playback. In embodiments of the present invention, the security of the client computing system for content processing is not dependent on the operating system (OS), basic input/output system (BIOS), media player application, or other host software. In order to compromise the system, one will need to compromise the hardware and/or firmware mechanisms, as opposed to attacking the software running on top of the OS.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs stored on a computer readable storage medium ("software"), or some combination of hardware and software. For the purposes of this disclosure reference to "logic" shall mean hardware, software (including for example micro-code that controls the operations of a processor), firmware, or some combination thereof.

Figure 1:
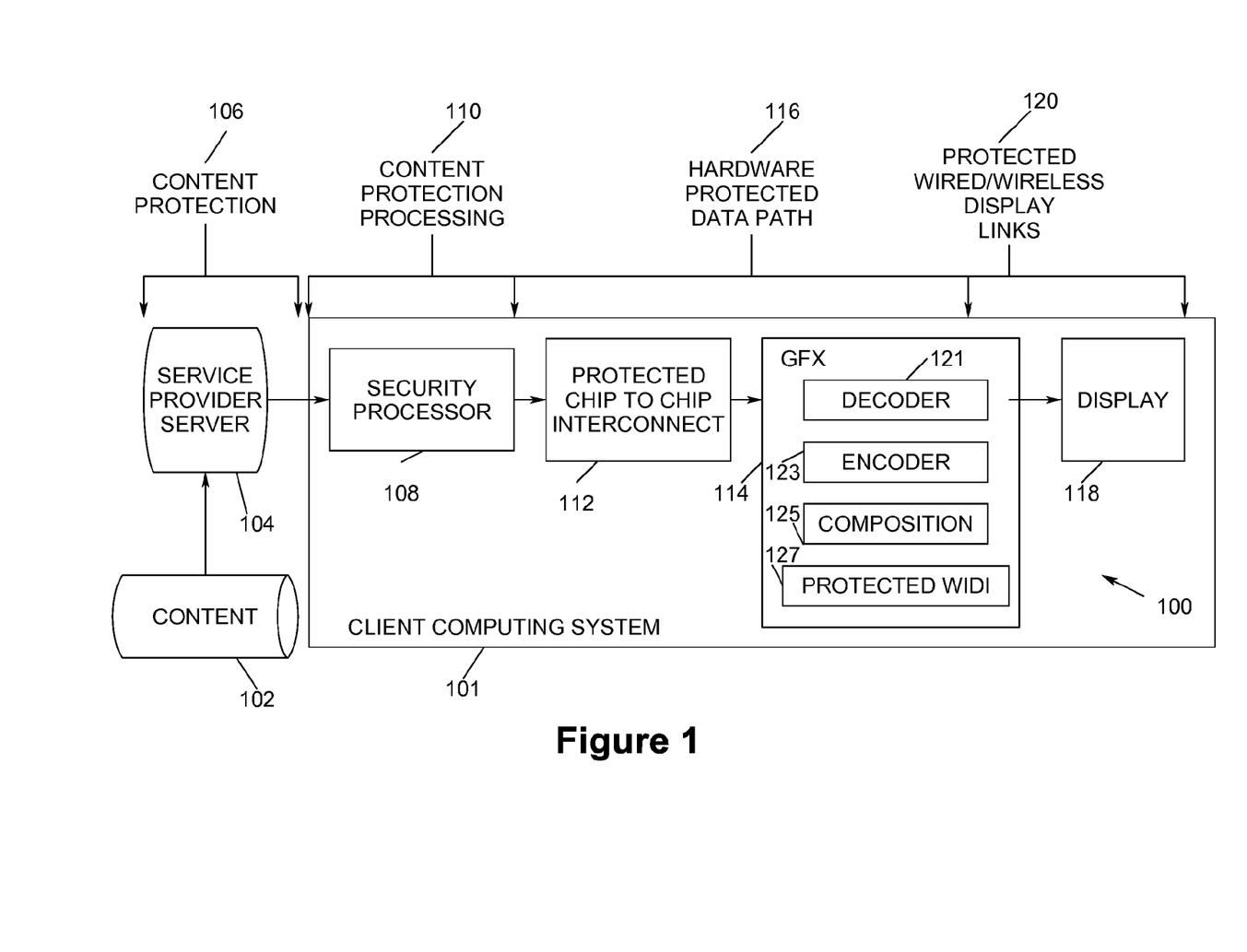
FIG. 1 is a diagram of a secure content processing pipeline according to an embodiment of the present invention.

Embodiments of the present invention protect content protection processing, key management processing, and content playback by using firmware and hardware in the CPU, chipset and integrated graphics/media engine of a client computing system 101 to perform these functions. Embodiments of the present invention provide end-to-end protection of the content as the content is processed by components within a computing system. FIG. 1 is a diagram of a secure content processing pipeline 100 according to an embodiment of the present invention. Content 102 may be accessible by a service provider (SP) server 104. Content 102 may be any digital information, such as audio, video, or audio/video data, images, text, books, magazines, games, or application programs. Service provider server 104 may include one or more servers for providing the content to a client computing system over any telecommunications channel (such as the Internet, cellular networks, wired or wireless networks, etc.). Content may be protected by any known content protection technology 106 (e.g., digital rights management (DRM) technology, cryptographic techniques, etc.) while stored in the SP server and during transfer to the client computing system 101. In one embodiment, the content may be protected by the Enhanced Privacy ID (EPID) signature verification protocol as discussed herein. In one embodiment, video data may be encrypted using the Advanced Encryption Standard (AES) cryptographic processing with CTR mode.

The client computing system 101 may be a PC, laptop, netbook, tablet computer, handheld computer, smart phone, personal digital assistant (PDA), set top box, consumer electronics equipment, or any other computing device capable of receiving, storing and rendering content.

Within the client computing system, content protection processing 110 may be performed by a Security Processor 108. In one embodiment, the security processor may be within a chipset of the client computing system. In an embodiment, the chipset comprises a platform control hub (PCH). In another embodiment, the Security Processor may be within the CPU of the client computing system. In another embodiment having a system-on-chip (SOC) configuration, the Security Processor may be integral with other system components on a single chip. In one embodiment, the security processor comprises a Manageability Engine (ME). In other embodiments, other types of security processors may be used. The Security Processor is a subsystem implemented in hardware and firmware that interacts with other components of the client computing system. The Security Processor operates by loading firmware code from a protected flash memory region and executing the firmware code in protected memory. Since the content protection processing is performed in hardware and firmware within the Security Processor, protection of the content may be improved over software-based systems.

Cryptographic key information may be sent from the security processor over a protected chip to chip interconnect 112 to a component containing a central processing unit (CPU) and an integrated graphics (GFX)/media engine. In an embodiment, the protected chip to chip interconnect 112 comprises a secure Direct Media Interface (DMI) communications link to the CPU/GFX component. DMI comprises a chip-to-chip interconnect with two unidirectional lanes of concurrent data traffic, and isochronous transfer with improved quality of service. Data transferred over the DMI link may be protected by known cryptographic processing techniques. In an embodiment, the chip-to-chip secure link may be used for passing encrypted title keys over the DMI. Security is based on a shared secret between the PCH and the CPU. This shared secret may be established on each power cycle and can vary between families of products, generations and random groupings as needed to ensure protection and integrity of the shared secret. The DMI mechanism is independent of the OS, the BIOS, and software running on the CPU. The DMI mechanism may be used to create a trust relationship between the security processor (in the PCH) and the CPU.

The GFX engine 114 may include content protection processing to decrypt the content. The GFX engine also includes decoder logic 121 to process/decode the decrypted audio/video content and pass the audio/video content as media blocks to a graphics processing unit (GPU) within the GFX engine 114. The GPU includes security techniques, including using encoder logic 123, to protect the media blocks during processing in memory. GFX engine 114 also includes composition logic 125 to compose the image data to be shown on display 118. As the content is being handled within and between the security processor in the PCH and the GFX engine in the CPU/GFX component, the content may be protected by a hardware protected data path 116. In an embodiment, the hardware protected data path comprises a Protected Audio Video Path (PAVP) to maintain the security of the content. PAVP also supports an encrypted connection state between system components. By using the PAVP, the system may further protect the content during transfer between system components and within memory.

The interface between the GFX engine, the PCH, and the display 118 may be implemented by protected wired/wireless display links 120. In one embodiment, display data sent from the GFX engine via a memory through the PCH to the display may be protected by a High-Bandwidth Digital Content Protection (HDCP) content protection scheme. The HDCP specification provides a robust, cost-effective and transparent method for transmitting and receiving digital entertainment content to compliant digital displays. In an embodiment, the wired link may be implemented according to the HDCP Specification, Revision 2.0, available from Digital Content Protection, LLC, or subsequent revisions. HDCP may be employed to deter copying of the display data as the data travels over a DisplayPort, Digital Visual Interface (DVI), High-Definition Multimedia Interface (HDMI), Gigabit Video Interface (GVIF), or a Unified Display Interface (UDI) connection. The HDCP revision 2.0 specification addresses emerging usage models that let end users conveniently connect displays, devices and home theater systems via standard protocols and interfaces like TCP/IP, USB, Wi-Fi and WirelessHD. The HDCP revision 2.0 specification uses standards-based RSA public key and Advanced Encryption Standard (AES) 128-bit encryption for robust content protection. In an HDCP system, two or more HDCP devices are interconnected through an HDCP-protected interface. The audiovisual content protected by HDCP flows from the Upstream Content Control Function into the HDCP system at the most upstream HDCP Transmitter. From there, the HDCP content, encrypted by the HDCP system, flows through a tree-shaped topology of HDCP receivers over HDCP-protected interfaces.

The HDCP content protection mechanism includes three elements: 1) Authentication of HDCP receivers to their immediate upstream connection (to an HDCP transmitter). The authentication protocol is the mechanism through which the HDCP transmitter verifies that a given HDCP Receiver is licensed to receive HDCP. 2) Revocation of HDCP receivers that are determined by the DCP to be invalid. 3) HDCP encryption of audiovisual content over the HDCP-protected interfaces between HDCP transmitters and their downstream HDCP receivers. HDCP receivers may render the HDCP content in audio and visual form for human consumption. HDCP receivers may be HDCP repeaters that serve as downstream HDCP transmitters emitting the HDCP content further downstream to one or more additional HDCP receivers. In one embodiment, display data sent to the display 118 may be sent over a protected wireless display (WiDi) link 127 using 802.11n wireless local area network (WLAN) technology.

As can be seen from FIG. 1, in embodiments of the present invention, from the time the content is received from the service provider server 104 until the content is displayed on the display 118, no cryptographic key or content is available in unencrypted form to any software or unauthorized hardware running on the computing system. Further, memory protection for video data is offered over the whole chain across the decrypt, decode/encode, compose and display pipelines. This capability is offered at the full memory bandwidth without compromising overall system performance.

Figure 2:
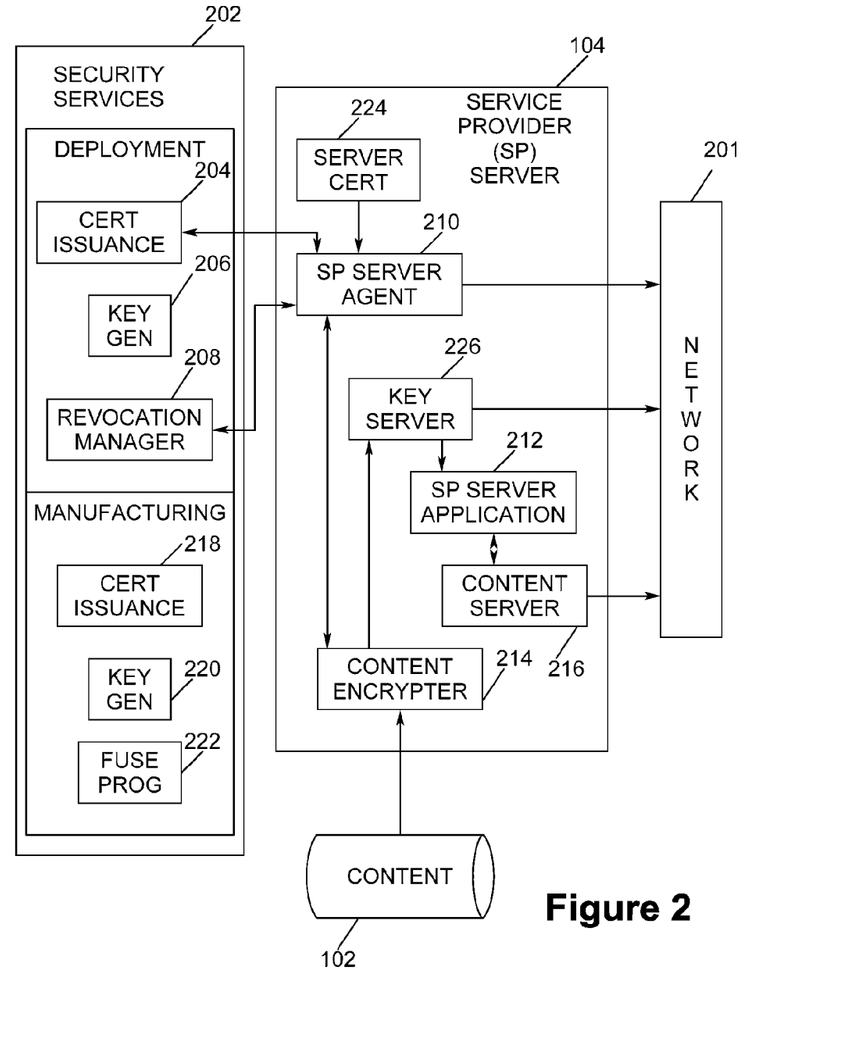
FIG. 2 is a diagram of a service provider server and security services infrastructure according to an embodiment of the present invention.

FIG. 2 is a diagram of a service provider server 104 and a security services component 202 according to an embodiment of the present invention. In an embodiment, security services component 202 may comprise one or more servers and/or components. In an embodiment, the security services component may be operated by the manufacturer of one or more components of the client computing system. The security services component provides capabilities for controlling client computing systems in the field. The security services component comprises a manufacturing component and a deployment component. The manufacturing component includes a certificate issuance component 218, a key generation (Key Gen) component 220, and a fuse programming (Fuse Prog) component 222. Certificate issuance 218 generates and issues public key certificates to each of the client computing platforms. Key Gen 220 is responsible for generating the private and public key pairs as needed for embedding into the client computing platforms. Fuse programming 222 is responsible for programming the fuses on the manufacturing floor with appropriate values in a robust and secure manner. These values would be used by the client computing platform to build up the trust anchors and key ladders inside the security processor.

The deployment component includes a certificate issuance component 204, a key generation (Key Gen) component 206, and a revocation manager 208. Certificate (Cert) issuance component 204 issues a digital certificate for the SP Server and Client components giving them the authorization to interact with such client systems for service deployment. Key generation (Key Gen) component 206 generates a cryptographic signing key pair, a root key pair, digital certificates, and group public keys, and signs the group public keys for each group. Revocation manager 208 determines identifiers and signatures of client computing systems to be added to a revocation list (RL), updates the RL, and distributes updated RLs.

The SP server 104 communicates over network 201 (such as the Internet) with the client computing system. The service provider server comprises a SP server application 212 and a SP server agent 210. The SP server application provides content browsing capabilities. The SP server agent 210 controls the sending of client specific messages, manages cryptographic keys and authorized user tokens, and maintains content delivery service status (for deployment purposes 212 and 210 could be physically different servers firewalled and separated). Content encrypter 214 accepts content 102 and encrypts the content for secure delivery to a client computing system. Content server 216 sends the encrypted content to the client. Key server 226 is responsible for provisioning the title keys to the client computing systems within an authenticated session. Server certificate 224 is used by the SP server agent to participate in mutual authentication and establishment of the authenticated session with the client computing systems. Communications links between SP server agent 210, key server 226, and content server 216 are protected by well accepted information security practices. The key server has the highest network and access protection to ensure only authorized parties are able to reach it and the keys managed by the key server are isolated and firewalled from attackers from outside network entities. The SP server agent or the key server has access to the private key associated with the server certificate 224. In an embodiment, this private key and all operations done with this private key are protected using a hardware security module (HSM) (not shown in FIG. 2) on the server.

In an embodiment, the cryptographic scheme used to authenticate the client computing system with the SP server comprises a cryptographic authentication protocol protecting a user's privacy based on the use of zero-knowledge proofs. In an embodiment, the cryptographic authentication protocol comprises the Enhanced Privacy ID (EPID) scheme, a Direct Anonymous Attestation (DAA) scheme with enhanced revocation capabilities. EPID mitigates the privacy issues of common Rivest, Shamir, Adleman (RSA)—public key infrastructure (PKI) security implementations where every individual is uniquely identified for each transaction. Instead, EPID provides the capability of remote attestation but only identifies the client computing system as having a component (such as a chipset) from a particular technology generation. EPID is a group signature scheme, where one group's public key corresponds to multiple private keys, and private keys generate a group signature which is verified by the group public key. EPID provides the security property of being anonymous and unlinkable—given two signatures, one cannot determine whether the signatures are generated from one or two private keys. EPID also provides the security property of being unforgeable—without a private key, one cannot create a valid signature.

Generally, setting up a secure communications channel with EPID may be accomplished as follows. A first party (such as the client computing system) sends an EPID certificate to a second party (such as the service provider server). Never knowing the identity of the first party and only knowing the first party is a computing platform with a trusted security processor, the second party authenticates the first party. The first party then authenticates the second party using the second party's public key certificate. Since the second party doesn't require privacy, the second party's public key certificate may not be an EPID certificate (but it could be). The parties may then enter into a Diffie-Hellman (DH) key exchange agreement.

Various suitable embodiments of DAA and EPID are described in the following co-patent applications, incorporated herein by reference: "An Apparatus and Method of Direct Anonymous Attestation from Bilinear Maps," by Ernest F. Brickell and Jingtao Li, Ser. No. 11/778,804, filed Jul. 7, 2007; "An Apparatus and Method for a Direct Anonymous Attestation Scheme from Short-Group Signatures," by Ernest F. Brickell and Jingtao Li, Ser. No. 12/208, 989, filed Sep. 11, 2008; and "Direct Anonymous Attestation Scheme with Outsourcing Capability," by Ernest F. Brickell and Jingtao Li, Ser. No. 12/286,303, filed Sep. 29, 2008. In other embodiments, other authentication and attestation schemes may also be used.

The client computing system comprises at least three main components—host software, chipset hardware/firmware, and the CPU/GFX/Media engines. It is assumed in embodiments of the present invention that the host software is untrusted. Even if the host software gets attacked, no secrets will be compromised. Host software is responsible for network connection to SP server 104 and downloading media from content server 216. Host software acts as a proxy between various SP servers and the chipset hardware/firmware. Host software sends encrypted content directly to the graphics hardware after the chipset hardware/firmware has completed title key unwrap and injection into the CPU/GFX component.

Chipset hardware/firmware is responsible for all protected processing, taking the role of the protected device for content protection processing. In an embodiment, the chipset hardware/firmware sends protected title keys to the graphics hardware using the DMI mechanism.

The CPU/GFX component is responsible for final stream decryption, decode and display. The GFX engine is a passive device, making no policy decisions. When asked, the GFX engine simply decrypts the content, then decodes the submitted video slices. In an embodiment, the GFX engine (with protected media encoders) re-encrypts the display content for HDCP output protection over HDMI and wireless (e.g., WiDi) displays.

A protected client computing system must be remotely identified by a service provider before sending highly sensitive information. The mechanism used to identify the platform must not violate user privacy. Embodiments of the present invention provide a protected mechanism for a service provider to verify over the network that the service provider server is communicating to a suitable client computing system and transfer title keys and other confidential material to that client computing system. In one embodiment, the protocol utilized to establish a protected session between the service provider server and the client computing system is EPID. EPID allows for a single public key to anonymously verify the signature generated by N-private keys in what is called an EPID group. To implement EPID, each chipset contains a unique private key blown into the platform control hub (PCH) fuses during silicon manufacturing. In an embodiment, the chipset manufacturer places 1,000,000 private keys in a single group and produces 400 groups for each chipset produced. In order to act as the EPID verifier, each service provider will be provisioned with these 400 public keys.

Once a protected EPID session has been established, the service provider server is free to exchange protected confidential information with the protected client computing system. For content streaming, protected title keys may be passed from an SP server to the security processor in the chipset. The security processor sends the protected title keys to the graphics and audio hardware. At this point, encrypted video and audio content can be directly sent from a content server 216 to client computing system graphics and audio hardware which decrypts, decodes, and displays the content. For downloading content, the security processor binds the title keys to the client computing system using a unique platform storage key (again burned into PCH fuses during manufacturing) and returns the bound keys to media player software. When playback is desired, the bound title keys are re-submitted to the security processor, which unbinds and sends them in a protected manner to the graphics and audio hardware.

Figure 3:
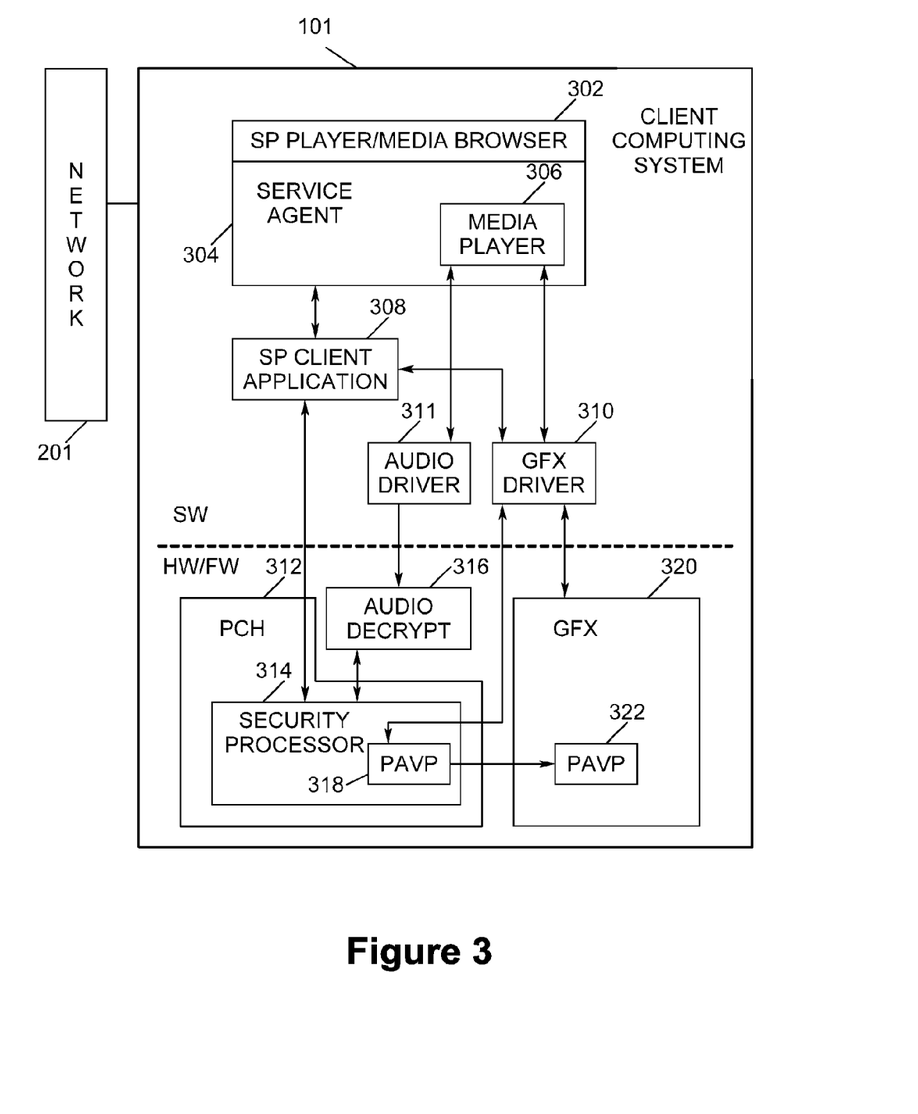
FIG. 3 is a diagram of a client computing system according to an embodiment of the present invention.

FIG. 3 is a diagram of a client computing system 101 according to an embodiment of the present invention. A service provider (SP) player/media browser software application 302 may be included in the software stack to interface with the SP server 104 over a network 201 such as the Internet. The SP player/media browser 302 allows a user to browse content offerings of the service provider and to select content to be delivered from the SP server to the client computing system. The SP player/media browser provides user interface controls for the user to manage a content library and to control the selection, downloading, and playback of content. The SP player/media browser interacts with service agent 304. Service agent 304 comprises a software application provided by a service provider that is authorized to access the features of the client computing system supporting end-to-end content protection according to embodiments of the present invention. The service agent interfaces with various SP player/media browser application programming interfaces (APIs) (not shown in FIG. 2). Service agent 304 comprises a media player component 306. The media player provides the content player functionality (e.g., controlling playback).

SP client application 308 enables the SP player/media browser 302 and the service agent 304 to access content protection features on the client computing system's hardware and firmware and for relaying messages to the service provider server 104. In an embodiment, the SP client application comprises a host agent software development kit (SDK) including content protection APIs. In an embodiment, the SP client application communicates with the security processor 314 in the platform control hub (PCH) 312 of the chipset.

Audio driver 311 provides an interface between the media player and audio decrypt hardware 316. Similarly, graphics (GFX) driver 310 provides an interface between the media player and the GFX engine 320. In an embodiment, the PCH 312 comprises security processor 314, which executes firmware to provide content protection functionality, along with other well known system functions. In an embodiment, the security processor may be implemented by a Manageability Engine (ME). As content is handled by the PCH 312 and the GFX engine 320, the content may be protected at least in part by Protected Audio Video Path (PAVP) components 318, 322 in the PCH hardware/firmware and GFX engine hardware, respectively.

Figure 4:
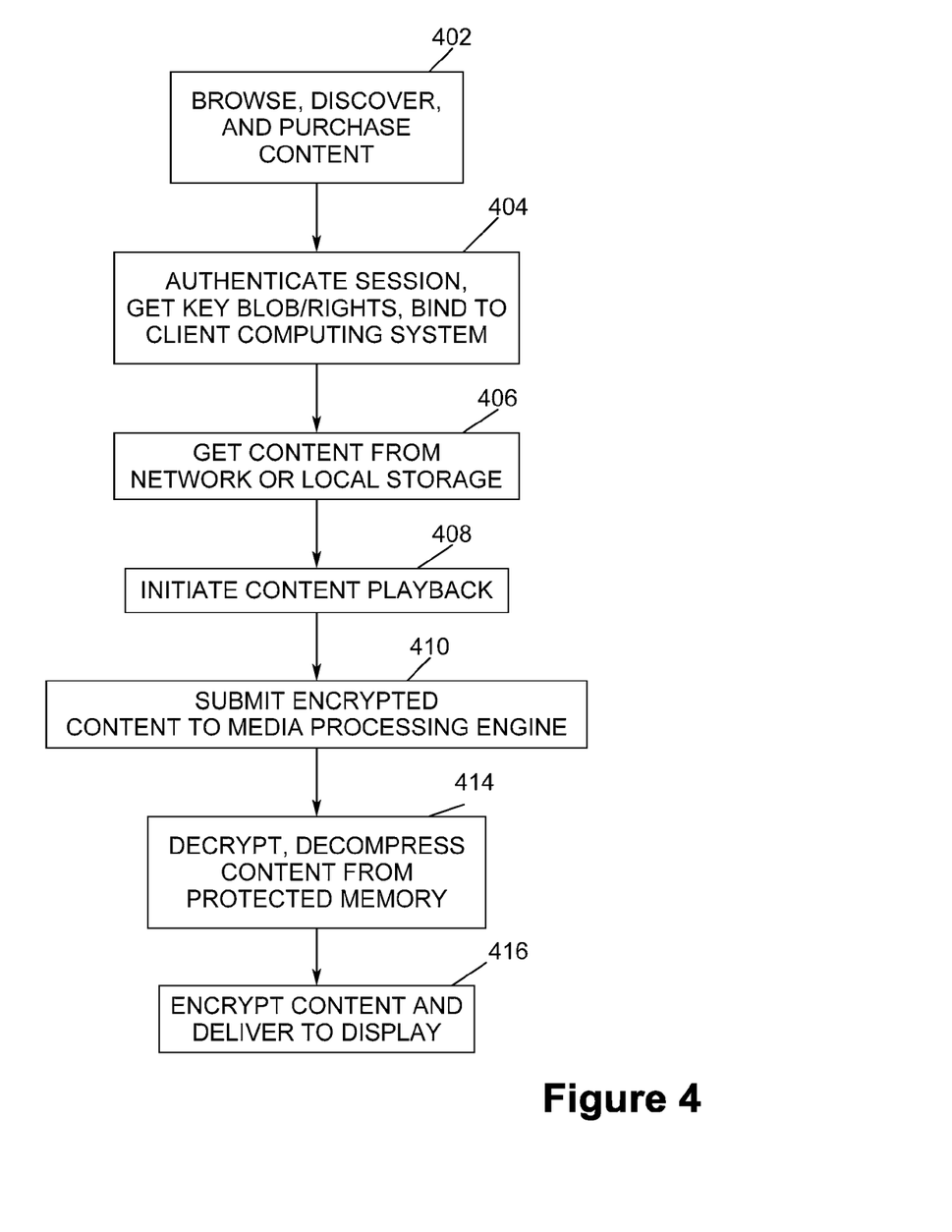
FIG. 4 is a flow diagram of secure content processing according to an embodiment of the present invention.

FIG. 4 is a flow diagram of secure content processing according to an embodiment of the present invention. At block 402, a user of the client computing system uses SP player/media browser 302 to browse, discover, and purchase content from one or more service providers. At block 404, mutual authentication of the SP Server 104 and the client computing platform 101 is performed. An authenticated session is established. Key blobs with usage rights for a given set of content are provisioned. The key blobs are bound to the client computing system to ensure that the system is both confidentiality and integrity protected as necessary.

The client computing system then gets the encrypted content at block 406 from content server 216 over network 201 (for streaming operations) or from local storage on the client computing system (for content previously purchased, downloaded, and stored). The system is prepared to work on video slices (e.g., sub-frame). As a result, the hardware can process the data as soon as the first slice of data is submitted.

At block 408, the user initiates playback of the selected content using the SP player/media browser 302. The key blob is submitted to the security processor 314 for unpacking and extracting of the title key. When that is done, the title key is loaded by the security processor into the graphics hardware 320 for decryption. The SP player/media browser submits the encrypted content to the media processing engine within GFX engine 320 at block 410. The GFX engine decrypts the content using the title keys and re-encrypts the content using a local protected key. Re-encrypted data may be stored in protected local or system memory. The re-encrypted content is subsequently obtained, decrypted, and decompressed at block 414. The decrypt is performed first. Once the data is decrypted, the data is decoded/decompressed. Once the data is decompressed, the data is re-encrypted and passed to the composition engine via the system memory. Once the composition is finished, the data is again protected and passed using system memory to the display engine. In an embodiment, each component along the way has the ability to decrypt, process and re-encrypt as necessary.

At block 416, the GFX engine re-encrypts the media content using HDCP technology (in an embodiment) and delivers the content to the display for viewing by the user. At each step of the process, the content is never in the clear where it is accessible by software or unauthorized hardware components running on the client computing system.

Figure 5:
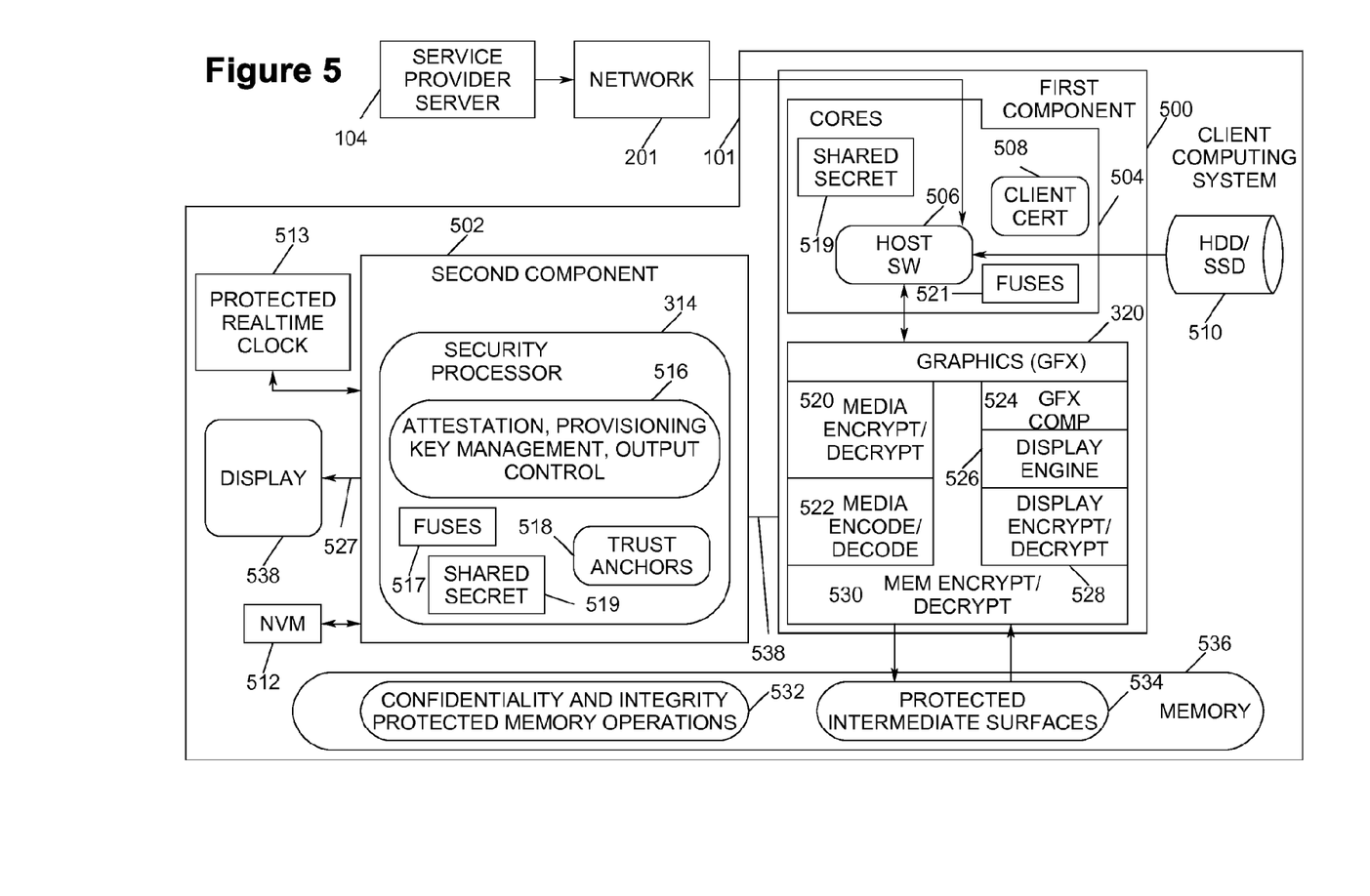
FIG. 5 is a diagram of a secure content processing system according to an embodiment of the present invention.

FIG. 5 is a diagram of a secure content processing system according to an embodiment of the present invention. A SP server 104 interacts over network 201 to client computing system 101. Client computing system comprises first 500 and second components 502. In an embodiment, the first component comprises a CPU and GFX component, and the second component comprises a platform control hub (PCH). In another embodiment, the first and second components may be combined into a single component in a system-on-a-chip (SOC) implementation. First component 500 includes a plurality of processor cores 504, and GFX engine 320.

Processor cores 504 execute various components of host software (SW) 506 (as described in FIG. 3), a client certificate 508, fuses 521, and a shared secret 519. Host SW reads data, including encrypted content previously obtained from a SP server or tangible media (such as a DVD, Blu-Ray, or other storage technology), from hard disk drive (HDD)/solid state drive (SSD) 510. In an embodiment, Host SW comprises at least a SP player/media browser application 302, a service agent 304, and a SP client application 308.

GFX engine 320 comprises a plurality of components. Media encrypt/decrypt engine 520 comprises logic to encrypt and decrypt content. Media encode/decode engine 522 comprises logic to encode and decode content. GFX Composition (Comp) engine 524 comprises logic to construct display images. Display engine 526 comprises logic to pass the composed display images to the display. Display encrypt/decrypt engine 528 comprises logic to encrypt and decrypt display data prior to sending the display data to display 538 over protected link 527. Memory encrypt/decrypt engine 530 comprises logic to encrypt and decrypt data stored in protected intermediate surfaces 534 in memory 536. Memory 536 also includes logic to implement confidentiality and integrity protected memory operations 532.

Second component 502 comprises a plurality of components, some of which are not shown in order to simplify FIG. 5. Second component comprises a security processor 314. Security processor includes firmware and/or hardware logic to provide attestation, provisioning key management, and output control operations 516 for the client computing system. Security processor also includes fuses 517, shared secret 519, and trust anchors 518 for supporting a PKI such as verification keys and key hierarchy information. Fuses 521, 517 are programmed into the hardware of the first and second components during manufacturing of the chipset with key material for EPID use. The hardware root of trust is built up from the information programmed into the fuses on the manufacturing floor when the client computing system is manufactured. This ensures that each individual client computing system is unique, yet privacy protected. Shared secret 519 is hard-coded into the hardware of the first and second components during manufacturing of the chipset and CPU/GFX components. In an embodiment, the shared secret may be used in setting up the secure chip to chip communications channel over the DMI link 538.

Client computing system also includes a protected real time clock 513 for providing secure clock services, a display 538, and a non-volatile memory (NVM) 512. In an embodiment, the protected real-time clock may be seeded by a third party, and may be virtualized for multiple service providers. The NVM may be used to store the firmware image for the second component, as well as to store temporary data (such as integrity and state information) for security processor processing operations.

In an embodiment, a processing flow may be described as follows. SP player/media browser 302 presents a user interface to the user. The user goes to the service provider's web site to browse available content. The SP web site has an auto detection capability to determine if the user's client computing system has integrated within it the capability of authenticating with the SP server 104. If capable, the user is allowed to choose content. The content may be bought, rented, or subscribed to, or may be streamed. The user pays for the content. SP player/media browser 302 invokes security processor 316 to authenticate the client computing system 101 with the SP server 104. In an embodiment, the authentication uses EPID technology. The client computing system 101 is authenticated at least in part by having the SP server 104 verify the client computing system's certificate 508, perform a revocation check, and verify a certification path to a certificate authority (using the EPID protocol in one embodiment). When both the client computing system 101 and the SP server 104 are authenticated, a secure communications channel may be set up based on the EPID protocol in one embodiment. In an embodiment, once the secure communication channel is set up, a command set may be used for end to end content protection capabilities.

The SP Server 104 provisions an encrypted title key to the client computing system, with constraints on usage of the content (e.g., time). The SP server sends the encrypted title key over the secure channel to security processor 314. Security processor 314 decrypts the encrypted title key, using its own key hierarchy. Security processor 314 uses a storage key to re-encrypt the newly decrypted title key to form a key blob. The key blob is bound to the client computing system for a specified time period. Security processor 314 sends the key blob to SP player/media browser 302 running in the CPU core. SP player/media browser 302 stores the key blob in HDD/SSD 510. SP player/media browser 302 then downloads the user-selected encrypted content. In one embodiment, the downloaded encrypted content may be stored in the HDD/SSD 510.

When a user wants to play the content, the SP player/media browser 302 submits the key blob back to the security processor 314. The security processor verifies the signature of the key blob, and checks usage constraints such as time, for example. The security processor 314 sends the encrypted title key over the encrypted channel (e.g., DMI link 538) to the media encrypt/decrypt component 520 of the GFX engine 320. The security processor instructs the SP player/media browser that the GFX/media engine is ready to process the encrypted content. The SP player/media browser 302 reads the encrypted content from the HDD/SDD 510, or obtains the encrypted content from the SP server 104 over the network 201 (for a streaming application), and sends the encrypted content to the GFX engine slice by slice.

The GFX engine 320 processes the encrypted content in a slice by slice manner. For each slice, the SP player/media browser reads the slice headers in the clear. The rest of the slice is encrypted so that the SP player/media browser cannot access the content. The SP player/media browser keeps track of playback state information using an initialization vector. The media encrypt/decrypt engine 520 decrypts the content using the title key, after decrypting the encrypted title key received from the security processor. In one embodiment, the output data of the media encrypt/decrypt engine is still compressed according to the well-known H.264 encoding scheme. In other embodiments, other encoding schemes may be used. The media encode/decode engine 522 decodes each slice and then re-encrypts the slice using memory encrypt/decrypt 530. The re-encrypted content slice is stored in protected intermediate surfaces 534 in memory 536. GFX composition engine 524 controls the composition of the image to be displayed on the display, including the foreground and background images, windows, etc. The GFX composition engine obtains the re-encrypted content slices from protected intermediate surfaces 534 in memory 536 to generate the composed image. The GFX composition engine 524 sends the composed image data to the display engine 526.

The display engine uses display encrypt/decrypt engine 528 to decrypt the composed image from the encryption that was used to store the content slices in memory 536. The display engine 526 uses the display encrypt/decrypt engine to re-encrypt the composed image data according to the HDCP technology, in one embodiment. The encrypted composed image data is sent by the GFX engine 320 over the protected chip to chip data interface (e.g., DMI link) 538 to the second component 502, for transfer to the display 538 over protected display interface link 527.

In an embodiment, there can be any number of concurrent, independent content streams being processed by the client computing system. Each content stream has its own cryptographic context so as not to interfere with other streams. This also allows for the client computing system to ensure that any kind of attack or compromise on one stream does not affect the other content streams.

Embodiments of the present invention support the following usage models:

1. Downloading of high definition (HD)/standard definition (SD)/Portable Definition (PD) content titles. The service providers distribute the content in the right format for a given client computing system. Users are able to opt for an electronic copy of a content title instead of obtaining physical optical discs (such as DVD or Blu-Ray discs).

2. Streaming of HD/SD/PD content titles. The service providers are able to setup a session and stream the content to a client computing system as needed. The client computing system stays connected to the service for the entire period of the content consuming experience.

3. Rental of HD/SD/PD content titles. The service providers are able to rent titles to consumers on an on-demand basis for a set time period. The protection and policy enforcement is done by an embodiment of the present invention.

4. Time-based unlocking of content titles. The service providers are able to push content to client computing systems ahead of the content release date or availability schedule and have the client computing system unlock the title for use at a given time in the future.

5. User's constellation of devices and easy sharing. Embodiments of the present invention provide for a "domain" of client computing systems for a given user. This enables the content to freely flow between these authorized devices within the user's domain.

6. Offline transactions. Embodiments of the present invention provide for the ability to record a transaction for later reconciliation. This allows the service providers to preload or speculatively distribute content to client computing systems and have them complete a transaction whether they are connected to the Internet or not.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A client computing system for processing content, content including one or more simultaneous protected content streams with distinct security properties and keying material, comprising:
    a media browser to receive a playback request of a requested content from a user;
    a first component including a plurality of processor cores and a graphics engine, at least one of the processing cores to execute a media player application and have a shared secret, the media player application to obtain encrypted content from a service provider server coupled to the client computing system over a network, the graphics engine to receive, in response to a receipt of the playback request for the requested content, a plurality of encrypted slices of the encrypted content of the requested content over a protected audio/video path, wherein the plurality of encrypted slices define a video frame, and each of the plurality of encrypted slices of the encrypted content includes a non-encrypted header to allow the media browser to read the header to keep track of the requested content;
    a second component coupled to the first component by a protected chip to chip data interface, the second component including a security processor to execute firmware to provide attestation and key management operations, and have the shared secret, the security processor to provide a hardware-based root of trust between the client computing system and the service provider server, to obtain a key blob having an encrypted title key associated with the encrypted content from the service provider server, to control content processing on the client computing system, and to pass the encrypted title key associated with the encrypted content to the graphics engine over the protected chip to chip data interface; and
    a display coupled to the second component by a protected display interface;
    wherein the graphics engine is to decrypt, decode, and decompress each encrypted slice of the video frame of the encrypted content using the encrypted title key received from the security processor, to re-encrypt each of the decrypted slices of the video frame, to generate composed display image data of the video frame based on the re-encrypted slices of the video frame within the graphics engine, and pass the composed display image data of the video frame to the display over the protected display interface.

2. The client computing system of claim 1, wherein the security processor is to establish the hardware-based root of trust by performing mutual authentication of the service provider server and the client computing platform by establishing an authenticated session, provisioning at least one key blob with usage rights for the encrypted content, the key blob comprising at least one encrypted title key associated with the encrypted content, and binding the key blob to the client computing system.

3. The client computing system of claim 2, wherein performing mutual authentication comprises performing a cryptographic authentication protocol protecting the user's privacy based on the use of zero-knowledge proofs.

4. The client computing system of claim 3, wherein performing the cryptographic authentication protocol comprises performing an Enhanced Privacy ID (EPID) authentication protocol.

5. The client computing system of claim 3, wherein the security processor sets up a secure communications channel between the security processor of the hardware-based root of trust in the client computing system and the service provider server based on the cryptographic authentication protocol.

6. The client computing system of claim 5, wherein the security processor is to receive, from the service provider server, over the secure communications channel, a key blob with constraints on usage of the encrypted content.

7. The client computing system of claim 6, further comprising a protected real-time clock, and wherein the security processor is to verify the signature of the key blob, and check usage constraints on the encrypted content.

8. The client computing system of claim 6, the key blob being bound to the client computing system for a specified time period.

9. The client computing system of claim 8, wherein the security processor is to decrypt the encrypted title key stored in the key blob, re-encrypt the title key, and pass the re-encrypted title key to the graphics engine over the protected chip to chip data interface for use in decrypting the encrypted content.

10. The client computing system of claim 9, wherein the graphics engine is to process the encrypted content in a slice by slice manner.

11. The client computing system of claim 1, wherein the graphics engine comprises:
a media encrypt/decrypt engine to encrypt and decrypt the plurality of slices of the video frame;
a media encode/decode engine to encode and decode the plurality of slices of the video frame;
a memory encrypt/decrypt engine to encrypt and decrypt the plurality of slices of the video frame read from and stored to a protected memory;
a graphics composition engine to compose the composed display image data of the video frame;
a display encrypt/decrypt engine to encrypt the composed display image data of the video frame; and
a display engine to send the encrypted composed display image data to the display over the protected display interface.

12. The client computing system of claim 1, wherein the protected chip to chip data interface comprises a Direct Media Interface (DMI) link.

13. The client computing system of claim 1, wherein the protected display interface comprises a high definition content protection (HDCP) link.

14. The client computing system of claim 1, wherein the protected display interface comprises a protected wireless display (WiDi) link.

15. The client computing system of claim 1, wherein the second component comprises a platform control hub and the security processor comprises a manageability engine.

16. The client computing system of claim 1, wherein the content comprises a plurality of concurrent, independent content streams, each content stream having a distinct cryptographic context.

17. A client computing system comprising:
a media browser to receive a playback request of a requested content from a user;
a plurality of processor cores, at least one of the processing cores to execute a media player application and have a shared secret, the media player application to obtain encrypted content from a service provider server coupled to the client computing system over a network;
a graphics engine to receive, in response to a receipt of the playback request for the requested content, a plurality of encrypted slices of the encrypted content of the requested content over a protected audio/video path, wherein the plurality of encrypted slices define a video frame, and each of the plurality of encrypted slices of the encrypted content includes a non-encrypted header to allow the media browser to read the header to keep track of the requested content; and
a security processor to execute firmware to provide attestation and key management operations, and have the shared secret, the security processor to provide a hardware-based root of trust between the client computing system and the service provider server, to obtain a key blob having an encrypted title key associated with the encrypted content from the service provider server, to control content processing on the client computing system, and to pass the encrypted title key associated with the encrypted content to the graphics engine; and
wherein the graphics engine is to decrypt, decode, and decompress each encrypted slice of the video frame of the encrypted content using the encrypted title key received from the security processor, to re-encrypt each of the decrypted slices of the video frame, to generate composed display image data of the video frame based on the re-encrypted slices of the video frame within the graphics engine, and pass the composed display image data of the video frame to the display over the protected display interface.

18. The client computing system of claim 17, wherein the security processor is to establish the hardware-based root of trust by performing mutual authentication of the service provider server and the client computing platform by establishing an authenticated session, provisioning at least one key blob with usage rights for the encrypted content, the key blob comprising at least one encrypted title key associated with the encrypted content, and binding the key blob to the client computing system.

* * * * *